United States Patent [19]
College et al.

[11] Patent Number: 5,628,811
[45] Date of Patent: May 13, 1997

[54] METHOD OF AMELIORATING ACID SOIL TO ENHANCE PLANT GROWTH

[75] Inventors: John W. College, Pittsburgh; Joel H. Beeghly, Bessemer, both of Pa.; K. Dale Ritchey; Virupax C. Baligar, both of Beckley, W. Va.; Ralph B. Clark, Charleston, W. Va.

[73] Assignees: Dravo Lime Company, Pittsburgh, Pa.; U.S. Department of Agriculture, Beltsville, Md.

[21] Appl. No.: 294,555

[22] Filed: Aug. 23, 1994

[51] Int. Cl.$^6$ .................................................. C07D 3/02
[52] U.S. Cl. ..................... 71/62; 71/61; 71/903; 47/DIG. 10
[58] Field of Search .................. 71/903, 61, 62; 47/57.6, DIG. 10

[56] References Cited

U.S. PATENT DOCUMENTS

| | | | |
|---|---|---|---|
| 3,988,141 | 10/1976 | Kajiyawa | 71/63 |
| 4,028,087 | 6/1977 | Schultz et al. | 71/25 |
| 4,410,350 | 10/1983 | Judd | 71/63 |
| 4,455,161 | 6/1984 | Cohen et al. | 71/24 |
| 4,954,134 | 9/1990 | Harrison et al. | 71/63 |
| 4,996,032 | 2/1991 | Stowe, Jr. et al. | 423/242 |
| 5,039,499 | 8/1991 | Stowe, Jr. | 423/242 |
| 5,084,255 | 1/1992 | College et al. | 423/242 |
| 5,270,026 | 12/1993 | College et al. | 423/243 |

OTHER PUBLICATIONS

Agronomy Journal vol. 72, Jan.–Feb. 1980, pp. 40–44.

Use of Gypsum in Soils: A Review, Advances in Soil Science vol. 9, Edited by B.A. Stewart (1989).

Phosphogypsum in Agriculture: A Review, I.S. Alcordo & J.E. Rechcigl (1993).

Soil Acidity and liming, Second Edition, Edited by Fred Adams (1984).

Long–term effects of gypsiferous coal combustion ash applied at disposal levels on soil chemical properties, Plant and Soil 154: pp. 29–32 (1993) R.F. Korcak & W.D. Kemper.

Vegetation of Waste Disposal Areas at a Coal–Fired Power Plant in Kansas, J. Environ. Qual. 18: pp. 285–292 (1989), D.W. Mulhern, R.J. Robel, J.C. Furness, and D.L. Hensley.

Calcium Deficiency in Clayey B Horizons of Savanna Oxisols—K.D. Ritchey, J. Euripedes Silva and Ubirajara F. Costa, Soil Science; vol. 133, No. 6 pp. 378–381 (1982).

Establishment of Vegetation on By–Product Gypsum Materials—H. Shahandeh & M.E. Summer, J. Environ. Qual. 22: 57–61 (1993).

Use of Flue Gas Desulfurization By–Products as Ag–lime Substitutes—P. Sutton & R.C Stehouwer: Amer Soc. of Agronomy (Abstract) (1992).

Fescue Growth on Acid Mine Spoil Amended With FGD and Sewage Sludge R.C. Stehouwer, P. Sutton & W.A. Dick, Ohio State University (Amer Soc. of Agronomy (Abstract) (1993).

Land Reclamation—G.W.T. Wilson, B.A.D. Hetrick, & A.P. Schwab; J. Environ. Qual. 20: 777–783 (1991).

Influence of Soil Solution Aluminum on Root Elongation of Wheat Seedlings R.J. Wright, V.C. Baligar, K.D. Ritchey & S.F. Wright: Plant and Soil 113, 294–298 (1989).

Use of High–Gypsum Flue Gas Desulfurization By–Products in Agriculture, Coal–Energy and the Environment— Edited by Shiao–Hung Chiang, pp. 40–45 (1993).

CA108:117910 m (Apr. 1988).

Stehouwer et al., Agron. Abstract 1992 (p. 293).

Ritchey et al., *Agronony Journal*, vol. 72, (Feb. 1980) pp. 40–44.

Primary Examiner—Brian M. Burn
Attorney, Agent, or Firm—Armstrong, Westerman, Hattori, McLeland & Naughton

[57] ABSTRACT

A method of ameliorating acid soils so as to enhance plant growth is provided by adding to soil 0.05 to 20 percent by weight, based on the weight of the soil, of a flue gas desulfurization by-product consisting essentially of 80–99 percent by weight of gypsum ($CaSO_4 \cdot 2H_2O$) and 1–20 percent by weight of magnesium hydroxide ($Mg(OH)_2$).

11 Claims, 1 Drawing Sheet

METHOD OF AMELIORATING ACID SOIL TO ENHANCE PLANT GROWTH

FIELD OF THE INVENTION

The present invention relates to a method of ameliorating acid soil so as to enhance plant growth by the addition to the soil of a particular gypsum-magnesium hydroxide additive, preferably one produced as a by-product in a process for removing sulfur dioxide from flue gases.

BACKGROUND OF THE INVENTION

The combustion of coal for the generation of electricity in power plants results in production of large quantities of waste or by-products such as fly ash, bottom ash, and flue gas desulfurization by-products (FGD-BPs). In flue gas desulfurization, large quantities of calcium sulfites or calcium sulfates are produced such as by reaction of lime or limestone with the sulfur dioxide in desulfurization units. The vast majority of such flue gas desulfurization by-products are disposed of in landfills or surface impoundments. Interest in using such by-products on agricultural land, especially as an acid soil amendment, has risen.

With the use of lime or limestone for desulfurization of flue gases, calcium sulfite, calcium sulfate (gypsum: $CaSO_4.2H_2O$) or mixtures thereof are normally produced, and the use of gypsum as a soil additive is known. High-sulfate gypsum by-products can enhance plant growth, as reported in *Phosphogypsum in Agriculture: A Review*, Alcordo, I. S. and Rechcigl, J. E.; Adv. Agron. 49:55–118 (1993). The applications of fluidized bed combustion by-products (FBC-BPs) to agricultural land and long-term effects and soil chemical properties of gypsiferous FBC-BPs have also been reported by Korcak, R. F., and Kemper, W. D.; "Long-term effects of gypsiferous coal combustion ash applied at disposal levels on soil chemical properties," *Plant and Soil* 154:29–32 (1993) and by Shainberg, I., Sumner, M. E., Miller, W. P., Farina, M. P. W., Payan, M. A., and Fey, M.V.; "Use of Gypsum on Soils: A Review", in *Advances in Soil Sciences*, Vol. 9 Springer-Verlag, New York (1989) at pages 1–111. Several studies have shown no effect of gypsum during the first year of application in field experiments even when applied at relatively high rates. Although some studies have shown enhanced growth due to calcium and sulfur, enhanced gypsum effects often occurred during droughty years which might indicate improved subsoil physical/chemical properties which improve plant access to subsurface water and nutrients. Plants grown on soils with especially low or marginal soil calcium might respond more extensively to calcium as a nutrient, and gypsum might be expected to enhance plant growth at any level of application, as described in "Calcium Deficiency in Clayey Horizons of Savanna Oxisols", by Ritchey, K. D., Silva, J. E., and Costa, V. F., *Soil Sci.*, 133: 378–382 (1982). Sources of gypsum used in most studies have been mined gypsum or phosphogypsum by-products derived from the phosphate fertilizer industry, and not coal combustion by-products. Gypsum contains a high sulfur content and phosphogypsum contains phosphorus, so sulfur and phosphorus as nutrients should not be ruled out as reasons for plant enhancement by these products.

Growth of weeping lovegrass [Eragrostis curvula (Schrader) Nees] and lespedeza [Lespedeza cuneata (Dum.-Cours.) G. Don] was very poor when plants were grown with unleached 100% FGD-BPs as described by Shahandeh, H. and Sumner, M. E. in "Establishment of Vegetation on By-product Gypsum Materials"; J, *Environ. Qual.* 22:57–61 (1993). Growth reductions were attributed to ion toxicity (probably B and/or Cl), salinity (high electrical conductivity, EC), and poor hydraulic properties (poor texture from high levels of silt-sized particles) of the FGD-BPs used. Growth was reduced unless these FGD-BPs were leached and mineral nutrients added, especially N, P, and K; N being the most limiting of the nutrients. Differences among FGD-BPs were also noted for root penetration and distribution. In other studies, alfalfa (Medicago sativa L.) and tall fescue (Festuca arundinacea Schreber) yields were increased by FGD amendment, although in the earlier harvests, yields were suppressed at the higher amendment rate, as reported by Sutton, P. and Stehouwer, R. C., in "Use of Flue Gas Desulfurization By-products as ag-lime substitutes"; In Agron. Abstr, p. 293, *Am. Soc. Agron*, 1992. Alfalfa yields were reduced more than tall fescue at the rates used (0.35 to 2.8% of soil mixes). Yields of later cuttings (3rd and 6th) of the plants grown with these coal combustion by-products (CCBPs) were similar. FGD-BPs added to acid coal mine spoil (overburden) and underclay (subsoil) at different rates (up to 24% of soil mix) reduced tall fescue growth, but yield of later cuttings was enhanced (Stehouwer, R. C., Sutton, P., and Dick, W. A., (1993). Fescue growth on acid mine spoil amended with FGD and sewage sludge. p. 50. *In Agron. Abstr., Am. SOc, Agron.*, Madison, Wis.). No unusual toxicity symptoms were noted on leaves, but leaf B for plants grown with one CCBP was sufficiently high to suspect potential B toxicity if certain plants were grown under similar conditions.

A flue gas desulfurization scrubber sludge impoundment was successfully vegetated with four of seven herbaceous [tall wheatgrass (Agropyron elongatum (Host) Beauv.), tall fescue, yellow sweet clover (Melilotus officinalis Lam.), and Japanese millet (Echinochloa crusgalli(L.) Beauv.)] and two of six tree [eastern cottonwood (Populus deltoides Marsh.) and eastern red cedar (Juniperus Virginiana L.] species tested when fertilizer (N, P, and K) and other amendments (cow manure for herbaceous plants and woodchips for trees) were added as reported by Mulhern, D. W., Robel, R. J., Furness, J. C., and Hensley, D. L. in "Vegetation of Waste Disposal Areas at Coal-Fired Power Plant in Kansas; *J. Environ. Qual.* 18:285–292 (1989). The treated plots had greater productivity than untreated plots seven years after the initial application of the products as reported by Wilson, G. W. T., Hetrich, B.A.D., and Schwab, A. P. in "Reclamation Effects on Mycorrhizae and Productive Capacity of Flue Gas Desulfurization Sludge" *J. Eviron. Qual.*20, 777–783 (1991). The greater productivity on the treated plots was attributed, in part, to mycorrhizal associations with roots.

We have now found that flue gas desulfurization by-products of primarily gypsum, which contain between one to about twenty percent magnesium hydroxide are, quite surprisingly, excellently suited for use as soil ameliorants to enhance plant growth.

SUMMARY OF THE INVENTION

A method of ameliorating acid soil so as to enhance plant growth in the soil comprises adding to the soil a flue gas desulfurization by-product consisting essentially of 80–99 percent by weight of gypsum ($CaSO_4.2H_2O$) and 1–20 percent by weight of magnesium hydroxide ($Mg(OH)_2$). This flue gas desulfurization by-product is added to the soil in an amount of between about 0.05 to 20 percent by weight based on the weight of the soil to be ameliorated. Preferably the flue gas desulfurization by-product is mixed with the soil, although surface applications with resultant leaching into the soil may be effective.

The flue gas desulfurization by-product may, in addition to the gypsum and magnesium hydroxide, contain minor amounts of other by-product residues such as up to 3 percent $SiO_2$, up to 1 percent $Fe_2O_3$, up to 1 percent $Al_2O_3$, and less than about 200 parts per million (ppm) of boron.

The addition of this gypsum and magnesium hydroxide flue gas desulfurization by-product has exceptional beneficial effects on shoot and root dry matter yield (DMY), and on total root length and specific root length, on plants grown in the ameliorated soil.

BRIEF DESCRIPTION OF THE DRAWINGS

The invention will become more readily apparent by the following description and reference to the accompanying drawings wherein.

DETAILED DESCRIPTION

Figure 1:
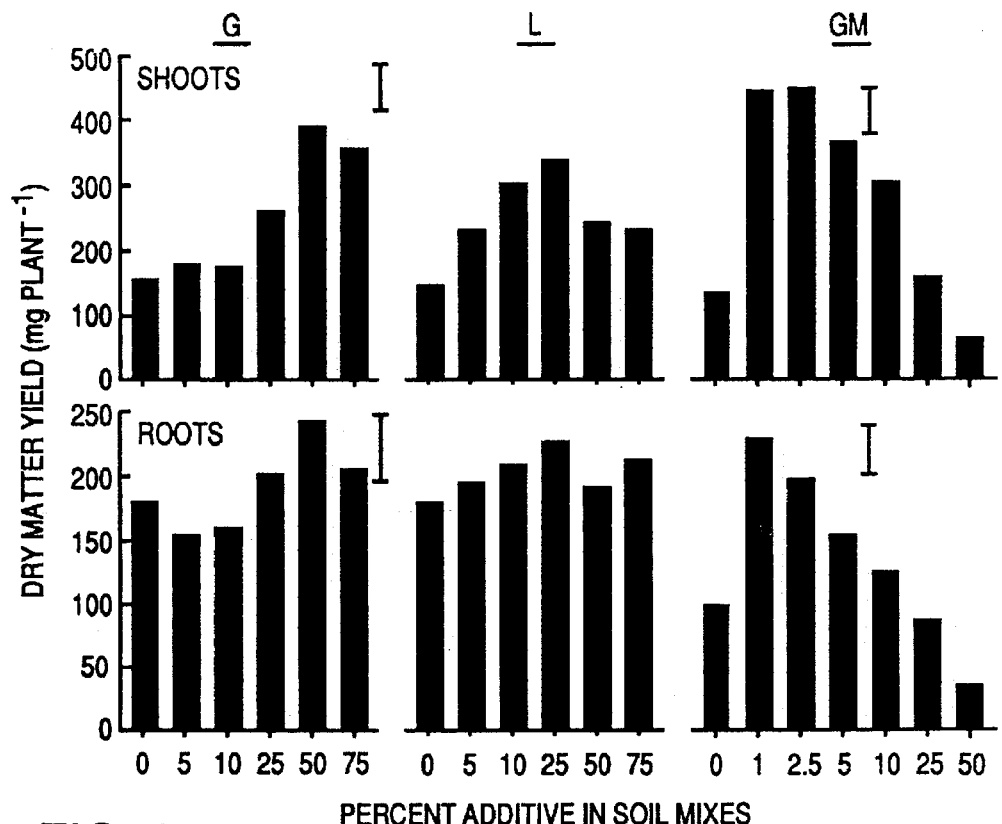
FIG. 1 is a graphical representation of the results of shoot and root dry matter yields of maize using two gypsum additions (G and L) and the flue gas desulfurization by-product (GM) of the present invention as soil ameliorants at various percentages of additive in the soil.

The present method provides for the amelioration of acid soil to enhance plant growth in the soil and also provides an environmentally beneficial method of using by-product waste from flue gas desulfurization systems without extensive treatment thereof.

The present method adds to an acid soil to be ameliorated about 0.05 to 20 percent by weight of a flue gas desulfurization by-product that consists essentially of about 80–99 percent by weight of gypsum and about 1–20 percent by weight of magnesium hydroxide.

A flue gas desulfurization system for the removal of sulfur dioxide from hot combustion gases which produces the by-product used in the present process is one which uses a lime or limestone slurry that contains a magnesium ion content in the slurry to enhance the sulfur dioxide removal with the production of calcium sulfite and magnesium sulfite in an effluent from the system. The effluent is oxidized to form calcium sulfate and magnesium sulfate, and further lime is added to the oxidized effluent stream to convert magnesium sulfate to magnesium hydroxide and produce gypsum, such as described in U.S. Pat. No. 4,996,032 and U.S. Pat. No. 5,084,255. Or, the flue gas desulfurization system which produces the by-product used in the present process may be one which uses a magnesium hydroxide solution in a scrubbing unit, with magnesium sulfite and magnesium bisulfite produced and discharged from the scrubbing unit, with the magnesium sulfite and bisulfite oxidized to magnesium sulfate. Magnesium-containing lime is then added to the oxidized effluent to convert magnesium sulfate to magnesium hydroxide and produce gypsum, such as described in U.S. Pat. No. 5,039,499 and U.S. Pat. No. 5,270,026. Or, the by-product may be produced by other flue gas desulfurization systems which produce a by-product containing gypsum and magnesium hydroxide.

In adding the gypsum-magnesium hydroxide flue gas desulfurization by-product to soil, the by-product is preferably mixed with the soil, such as by plowing, so as to disperse the same throughout the soil. Such mixing may be done immediately following deposition of the flue gas desulfurization by-product onto the soil or after passage of a period of time following such deposition and prior to planting. Or, the gypsum-magnesium hydroxide flue gas desulfurization by-product may be applied to the surface of the soil without mixing and rain or other moisture application will cause leaching thereof into the soil.

The flue gas desulfurization by-product is used in a concentrated form after dewatering of the aqueous by-product slurry. The flue gas desulfurization by-product will, in addition to the gypsum and magnesium hydroxide contain minor amounts, generally less than about 5–6 percent by weight of contaminants resulting from the carbonaceous fuel combustion, such as minor amounts of fly ash, or the like. Generally, such contaminants will comprise up to about 3 percent by weight of silicon dioxide ($SiO_2$), up to about 1 percent by weight of ferric oxide ($Fe_2O_3$), up to about one percent by weight of aluminum oxide ($Al_2O_3$) and other minute contaminants, such as less than about 200 parts per million of boron. The flue gas desulfurization by-product is devoid of sulfite salts since sulfites, such as calcium sulfite and magnesium sulfite, are deleterious to plant growth for which the by-product is used. The term "devoid" as used herein is meant to limit the sulfite salts to less than about 0.25 percent by weight.

The flue gas desulfurization by-product contains 80–99 percent by weight gypsum and 1–20 percent by weight magnesium hydroxide. Preferably the flue gas desulfurization by-product contains about 90–97 percent by weight gypsum and 3–10 percent by weight magnesium hydroxide, and most preferably 93–96 percent by weight of gypsum and 4–7 percent by weight of magnesium hydroxide.

The flue gas desulfurization by-product is added to the soil to be ameliorated in an amount of between about 0.05–20 percent by weight. Preferably, the flue gas desulfurization by-product is added in an amount of 0.05–10 percent by weight and most preferably in an amount of 0.05–2.5 percent by weight. An amount of about 0.05 percent by weight of flue gas desulfurization by-product would be equivalent to spreading the same on the surface of the soil in an amount of about 0.5 tons per acre of land, while an amount of about 1.0% by weight would be equivalent to spreading on the surface of the soil about 10 tons per acre of land, and 2.5% by weight would be equivalent to spreading on the surface of said soil about 25 tons per acre of land, and mixing the same at a conventional plowing depth of about 8 inches.

The invention will be further understood from the following Example, which is provided to illustrate the invention and in which all parts are parts by weight unless otherwise indicated.

EXAMPLE

Tests were performed to determine the effect of addition of a magnesium hydroxide-containing gypsum flue gas desulfurization by-product, as an additive, on plant growth and on some soil chemical properties.

Experiments were conducted in a greenhouse (25°±3° C.) using natural and artificial light to extend short days to 14-hour day lengths and to provide extra light during cloudy days (400–500 µmol $M^{-2}s^{-1}$ at plant height). Artificial light was provided by high-pressure sodium lamps. Maize (PA329×PA353P) was grown with three additives at different levels (see legend of FIGS. 1 and 2 for amount of each additive used) with an acid Porters soil (coarse-loamy, mixed, mesic, Umbric Dystrochrepts) which had been fertilized with 50 mg N $kg^{-1}$ soil as $NH_4NO_3$(100 kg N $ha^{-1}$) and 400 mg P $kg^{-1}$ soil as $KH_2PO_4$ (400 kg P $ha^{-1}$). Three additives were tested; a flue gas desulfurization by-product suitable for use as wallboard gypsum (G) as a control, a by-product from a limestonebased sulfur dioxide removal process (L) as a further control, and a high purity gypsum flue gas desulfurization by-product containing about 5.3% magnesium hydroxide (GM).

Chemical analysis of the three additives were performed and showed the following percentages by weight:

Additive G
  99.79% $CaSO_4 \cdot 2H_2O$
  0.12% as MgO
  0.5% $SiO_2$
  0.4% $Fe_2O_3$
  0.4% $Al_2O_3$
  <200 ppm boron Additive L
  99.84% $CaSO_4 \cdot 2H_2O$
  0.01% as MgO
  0.07% $SiO_2$
  0.07% $Fe_2O_3$
  0.05% $Al_2O_3$
  <200 ppm boron Additive GM
  91.6% $CaSO_4 \cdot 2H_2O$
  5.3% $Mg(OH)_2$ (3.62% as MgO)
  1.38% $SiO_2$
  0.12% $Fe_2O_3$
  0.53% $Al_2O_3$
  <200 ppm boron The additive was thoroughly mixed with soil by hand to assure homogeneity of the soil mix. Soil-additive mixes had deionized water added to provide moisture at field capacity, were enclosed in plastic bags, and equilibrated seven days at ambient temperature before being placed in pots (1.0 kg dry weight soil mix pot$^{-1}$) for plant growth. A small amount (20 to 25 g) of the initial soil mix from each pot was saved for pH and EC measurements. Some chemical properties of the original soil were: 13.2% organic matter; 3.88 (1 soil:1 0.01M $CaCl_2$) and 4.22 (1 soil:1 water) pH; 2.70 P (Bray-1-extractable) and 3.86 Mn (0.005M DTPA-extractable) in $\mu g\ g^{-1}$; 6.11 total acidity and 5.38 Al (1M KCl-extractable) in $cmol_c\ kg^{-1}$; and 0.18K, 0.10 Mg, 0.24 Ca, and 0.03 Na (1N ammonium acetate-extractable) in $cmol_c\ kg^{-1}$.

Maize seeds were surface sterilized with 0.5M NaOCl (household bleach) for five minutes, rinsed thoroughly with deionized water, and germinated between wrapped germination papers moistened with deionized water containing $CaSO_4$. Three 3-day-old maize seedlings were placed in each pot of soil mix, and irrigated with deionized water. Deionized water was added every other day initially and daily after plants became established to provide sufficient water for plant growth. Water was added manually and leaching from soil was prevented.

Different experiments were conducted over time to test the additives. Control treatments in each experiment consisted of plants grown in unamended soil with added fertilizer only. The experimental design for each experiment was a completely randomized block with four replications. After 21 days growth in pots, shoots were severed about 0.5 cm above soil surface, dried in a forced-air oven at 60° C., and weighed Soil was shaken from roots and representative soil samples were saved for pH-water (1 soil:1 water), pH-$CaCl_2$ (1 soil:1 0.01M $CaCl_2$), and EC (1 soil:1 water) measurements. Roots were thoroughly washed from soil, blotted dry, weighed for fresh weight, cut into 1 to 2 cm segments, and mixed thoroughly. A representative sample was taken to determine total RL (root length) using a Comair RL scanner (Commonwealth Aircraft Corp., Ltd., Melbourne, Australia). Remaining roots were dried and weighed similar to shoots. Root samples used for RL measurements were weighed for fresh weight, dried, weighed, and added to give total root DMY (dry matter yield). Specific RL was calculated: Specific RL=total RL/total root DMY (m $g^{-1}$ root DMY).

RESULTS

Shoot and Root Dry Matter Yields (DMY)

Shoots showed no significant increase in DMY until G was added at 25% (FIG. 1). An additional increase in shoot DMY occurred when 50% G was added, and remained constant at 75%. Maximum shoot DMY at 50% G was about 2.5-fold higher than for plants grown in unamended soil. Root DMY of plants grown with G showed slight but insignificant decreases at 5 and 10%, and increased at higher rates (25, 50, and 75%). Maximum root DMY for plants grown with G was only slightly above that of plants grown in unamended soil.

Shoot DMY of plants grown with L increased consistently as rate increased to 25% before declining slightly at the highest rates (50 and 75%) (FIG. 1). Root DMY of plants grown with L were similar over all rates used, although slightly higher than plants grown in unamended soil.

Shoot DMY increased 2.9-fold and root DMY increased 2.4-fold when GM was added to acid soil at only 1%, remained about as high up to 2.5% by-product in soil, and declined consistently as level increased from 5 to 50% (FIG. 1). At the highest level of GM, shoot DMY was 53% and root DMY was 34% of plants grown in unamended soil. Shoots were affected more than roots when plants were grown with G and L, and shoots and roots were affected similarly when plants were grown with GM. In summary, shoot and root DMY for GM at a 1% addition rate was better than for G and L at a 5% addition rate.

Root Lengths

Figure 2:
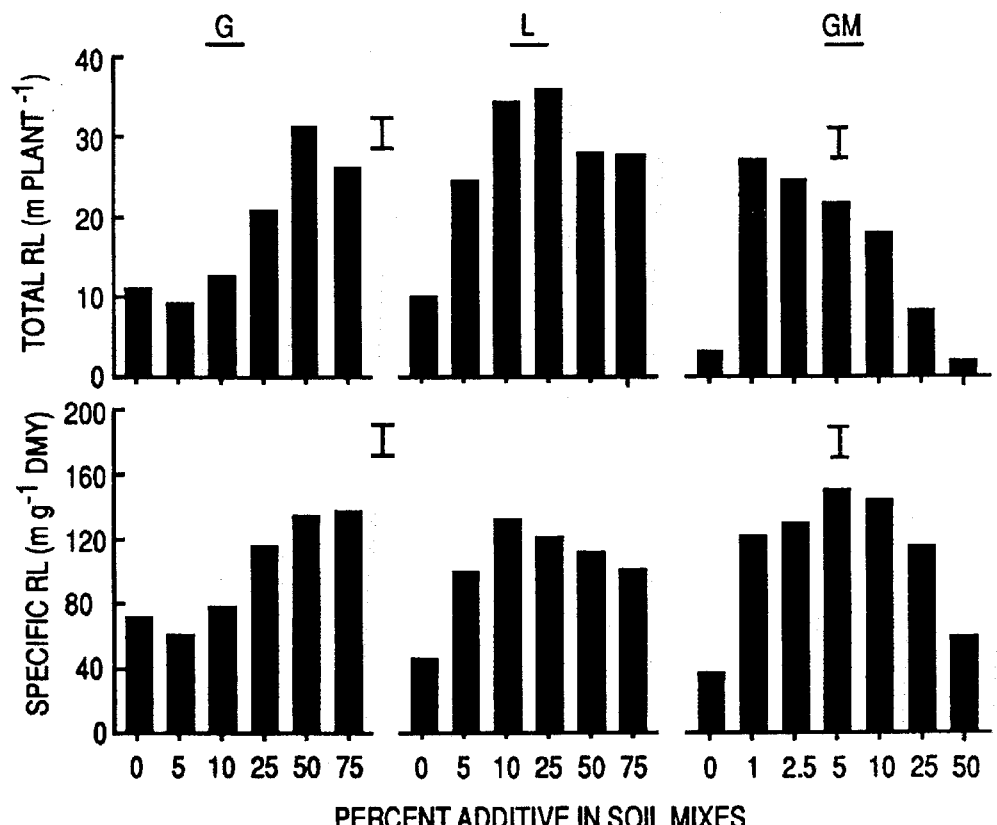
FIG. 2 is a graphical representation of the results of total and specific root length of plants using the additives as described in FIG. 1 in soil amelioration.

Total RL decreased slightly at the 5% rate of G before increasing steadily as rate increased to a maximum at 50% (about 3-fold higher than plants grown in unamended soil), and decreased slightly below the 50% maximum at the highest rate (75%) (FIG. 2). Total RL of plants grown with L increased to a maximum of 3.3-fold higher than plants grown in unamended soil at 25% before decreasing slightly as rate increased to 50 and 75% (FIG. 2). Total RL of plants grown with 1 and 2.5% of GM was over 7-fold higher than plants grown in unamended soil, and decreased consistently as level of by-product increased from 5 to 50% (FIG. 2). Total RL of plants grown with 50% GM was only about half that of plants grown with unamended soil. Specific RL (a definition of root fineness, branching, and extensibility) increased only after 10% of G was added and increased thereafter as rate increased to a maximum (2-fold increase above that of plants grown in unamended soil) at 50 and 75% (FIG. 2). Specific RL consistently increased and reached a maximum (2.3-fold increase) at 10% L and decreased only slightly as level increased to 75%. Specific RL of plants grown with 1 to 2.5% GM was similar (3- to 4-fold higher than plants grown with unamended soil), but decreased dramatically at the highest level (50%). Except for GM at the highest level (50%) and G at the lowest levels (5 and 10%), the three additives were equally effective in enhancing specific RL for maize. GM and L were more effective than G in enhancing specific RL at the low levels added. Even at the highest level of GM, specific RL was still above that of plants grown in unamended soil. In summary, the use of GM at a 1% addition rate was as effective as L and much more effective than G at a 5% addition rate.

Soil pH and Electrical Conductivity

Soil pH and EC values were similar before and after plants were grown in soil mixes. pH-$CaCl_2$ values were lower (pH 3.9) than pH-water (pH 4.3) values only in unamended soil after plants had grown in the soil mixes. Because of similarities between pH and EC values before and after plants were grown, only pH-$CaCl_2$ and EC soil values after plants were grown in pots have been reported.

pH-$CaCl_2$ for unamended soils ranged from 3.82 to 4.00

TABLE I pH—$CaCl_2$ and EC (dS $m^{-1}$) of acid soil mixed with different rates of additives

| Trait | Percent Additive in soil mix | Additive | | |
|---|---|---|---|---|
| | | G | L | GM |
| pH—$CaCl_2$ | 0 | 4.00 | 4.00 | 3.82 |
| | 1 | — | — | 4.22 |
| | 2.5 | — | — | 4.60 |
| | 5 | 4.07 | 4.29 | 5.38 |
| | 10 | 4.18 | 4.36 | 6.40 |
| | 25 | 4.26 | 4.78 | 7.50 |
| | 50 | 4.65 | 5.77 | 8.30 |
| | 75 | 5.52 | 6.54 | — |
| | LSD (0.05) | 0.06 | 0.06 | 0.27 |
| EC | 0 | 0.11 | 0.11 | 0.10 |
| | 1 | — | — | 1.22 |
| | 2.5 | — | — | 1.62 |
| | 5 | 1.48 | 1.12 | 2.05 |
| | 10 | 1.67 | 1.09 | 2.38 |
| | 25 | 1.62 | 1.14 | 2.72 |
| | 50 | 1.71 | 1.22 | 3.20 |
| | 75 | 1.68 | 1.20 | — |
| | LSD (0.05) | 0.18 | 0.18 | 0.21 |

Soil pH increased to 5.52 for G and 6.54 for L when added at 75% and 8.3 when GM was added at 50%, as shown in Table I. Soil EC increased to about 1.7 for G and about 1.2 for L added at 75% and to 3.2 for GM added at 50% (Table I). Soil EC values for G and L added from 5 to 75% were relatively constant (a large increase in soil EC occurred between 0 and 5% of added additive), but increased consistently as level of GM increased.

The slight decrease in root DMY and no increase in shoot DMY at low levels of G (5 and 10%) were real and verified when maize was grown with chemical grade $CaSO_4.2H_2O$ (purified gypsum). Maize grown with chemical grade $CaSO_4.2H_2O$ at rates of 0.5 to 1.0% in soil mixes had shoot DMY about half and root DMY about one-third those of plants grown on unamended acid soil. Shoot and root DMY of plants grown with chemical grade $CaSO_4.2H_2O$ increased thereafter as rate increased from 2 to 4% to become comparable to plants grown in unamended soil. The DMY above that of plants grown in unamended acid soil was not obtained until G was added above 5% for shoots and 10% for roots (FIG. 1). Above 10% levels of G, shoot and root DMY continued to be fairly high and was similar to DMY for L. The reduced DMY at low rates of G may have been caused by displacement of Al by $CaSO_4.2H_2O$ from soil exchange sites into soil solution which could enhance Al toxicity. Wheat (Triticum aestivum L.) root elongation decreased in an acid soil with addition of $CaCl_2$ and $CaSO_4.2H_2O$ which increased soil solution Al; $CaCl_2$ had greater effects than $CaSO_4.2H_2O$ (Wright R. J., V. C. Baligar, K. D. Ritchey, and S. F. Wright. 1989. Influence of soil solution aluminum on root elongation of wheat seedlings. *Plant and Soil* 113,294–298). When G or L were incorporated or surface applied to an acid Porters soil in columns and leached with water, relatively high amounts of Al were noted in leachates (Wendell R. R., and K. D. Ritchey. 1993. Use of high-gypsum flue gas desulfurization by-products in agriculture. p. 40–45. In: S.-H. Chiang (ed.) 10th Ann. Int. Pittsburgh Coal Conference. Univ. Pittsburgh, Pittsburgh, Pa.). The reason for the lack of reduction in DMY with L at low rates of application was likely because this by-product contained sufficient alkaline elements to inactivate Al.

The large enhancement of DMY at 1 and 2.5% GM was most likely due to the added Mg in this by-product. When Mg was added to acid Porters soil at low levels, DMY increased dramatically compared to plants grown in unamended soil. Magnesium can be a limiting nutrient for plants grown on many acid soils (Adams F.(ed.). 1984. *Soil acidity and liming*, Second edition. Am. Soc. Agron., Crop Sci. Soc. Am., and Soil Sci. Soc. Am., Madison, Wis.). Once Mg became high and above normal levels in GM, DMY decreased consistently as level increased (FIG. 1).

The responses of maize to the additives used indicated that DMY enhancement was not caused by changes in water availability since water was not limiting in these studies (plants were not allowed to undergo water stress). The enhanced growth effects of the additives were most likely because of enhanced nutrient or decreased toxicity factors.

Morphological traits are sometimes preferred to developmental traits to assess root growth characteristics. Total RL reflects developmental while specific RL reflects morphological traits. High specific RL indicates small diameter, fine, highly-branched, and long roots while low specific RL indicates large diameter, stubby, poorly-branched, and short roots. Except for GM at 50%, the additives used in these studies did not cause specific RL to be below that noted for plants grown in unamended soil. That is, the additives tended to enhance or maintain favorable morphological root characteristics (fine, highly branched, and small diameter roots) even though total RL was reduced.

Soil pH increased as the level of additives increased with GM causing increases above pH 7. Mineral nutrient imbalances (e.g. iron and zinc deficiencies) may occur when soil pH values rise above 7.0 to 7.5. As long as GM were not applied at levels above about 25% of the soil mix, mineral nutrient imbalances would not likely appear. Soil pH values for additives G and L were below at 75% levels in soil mixes.

Salinity problems do not usually occur in plants until soil EC values are greater than about 1.5 (salt sensitive), 3.5 (moderately salt sensitive), or 6.5 (moderately salt tolerant) dS $m^{-1}$. The additives at the highest rates used could potentially decrease yields of salt sensitive plants, but these high rates would not likely be used in the field unless the additives were being applied at very high rates. The additives caused soil EC to rise to 1.7 (G) and to 1.2 (L) at 75%, and to 3.2 at 50% GM. The high soil EC for GM was most likely caused by the high Mg [5.3% $Mg(OH)_2$]. The soil EC values from the other two additives, G and L, would not likely be deleterious to growth of most salt sensitive plants.

These results show the effects of additives to acid soil on maize growth and on soil pH and EC under controlled growth conditions. These tests were conducted under relatively ideal conditions using disturbed soil rather than undisturbed soil and uncontrolled weather conditions in the field. Pots in which the plants were grown had water added manually to prevent leaching. Leaching would occur in the field, and some of these additives likely contain compounds that reduce plant growth unless removed. These data about additive effects on plant growth and on soil pH and EC show that the additives are different from each other, and each additive will likely have different effects on plant growth and soil chemistry.

What is claimed is:

1. A method for ameliorating acid soil to enhance plant growth therein comprising:

adding to said acid soil an amount of between 0.05 to 20 percent by weight of a flue gas desulfurization by-product consisting essentially of 80 to 99 percent by weight gypsum and 1–20 percent by weight magnesium hydroxide.

2. The method as defined in claim 1 wherein said flue gas desulfurization by-product also contains up to 3 percent $SiO_2$, up to 1 percent $Fe_2O_3$, up to 1 percent $Al_2O_3$, and less than 200 ppm boron.

3. The method as defined in claim 1 wherein said flue gas desulfurization by-product is applied to the surface of said soil and subsequently mixed therewith.

4. The method as defined in claim 3 wherein said flue gas desulfurization by-product is mixed with said soil immediately following deposition thereon.

5. The method as defined in claim 3 wherein said flue gas desulfurization by-product is mixed with said soil subsequent to deposition thereon but prior to planting of said soil.

6. The method as defined in claim 3 wherein said flue gas desulfurization by-product is mixed with said soil by leaching of the same into said soil.

7. The method as defined in claim 1 wherein said flue gas desulfurization by-product is added to said soil in an amount of about 0.05 to 10 percent by weight.

8. The method as defined in claim 1 wherein said flue gas desulfurization by-product is added to said soil in an amount of about 0.05–2.5 percent by weight.

9. The method as defined in claim 1 wherein said flue gas desulfurization by-product contains about 3–10 percent of said magnesium hydroxide.

10. The method as defined in claim 1 wherein said flue gas desulfurization by-product contains about 4–7 percent by weight of said magnesium hydroxide.

11. A method of ameliorating acid soil to enhance plant growth therein comprising:

adding to said soil an amount of between 0.05–2.5 percent by weight of a flue gas desulfurization by-product consisting essentially of about 93–96 percent by weight gypsum, 4–7 percent by weight magnesium hydroxide, up to 3 percent $SiO_2$, up to 1 percent $Fe_2O_3$, up to 1 percent $Al_2O_3$, and less than 200 ppm boron.

\* \* \* \* \*